Inventors,
Arthur G. Walters
John W. Martin
By: S. J. Rotondi + A. J. Dupont

United States Patent Office 3,110,261
Patented Nov. 12, 1963

3,110,261
ROCKET PROJECTILES
Arthur Gwynfryn Walters, Plevna Lodge, Hartford Road, Bexley, England, and John William Martin, 37a Birchwood Road, Wilmington, England
Filed July 22, 1958, Ser. No. 750,272
Claims priority, application Great Britain July 29, 1957
6 Claims. (Cl. 102—51)

This invention relates to rocket projectiles.

The stability of a rocket projectile is improved by imparting to it a slow axial spin. Axial spin can be obtained by the use of fins or vanes attached to the rocket body and inclined to the rocket axis. This method of imparting spin has the disadvantage that since the angular acceleration of the rocket is a function of its linear velocity the spin develops slowly and consequently very little spin is imparted during the early part of the rocket trajectory where the effects of instability are most serious. Furthermore the spin continues to increase throughout the rocket trajectory when applied by means of inclined fins, which is disadvantageous. Best results are obtained by applying a slow spin which rapidly attains its required value before any substantial amount of the main driving charge is burnt and thereafter remains constant or decreases.

The object of the present invention is to provide a means of applying a slow spin which rapidly rises to the required value and thereafter remains substantially constant.

The present invention therefore comprises a rocket projectile, having subsidiary nozzles symmetrically spaced around the body of the projectile, each nozzle being similarly inclined at a substantial angle to the projectile axis and to the perpendicular from the nozzle to that axis, through which nozzles propellant gases are arranged to be discharged during the early stages of the flight of the projectile to which spin is thereby imparted.

The propellant gases discharged through the subsidiary nozzles may be derived either from the main propellant charge or from a smaller auxiliary charge in a separate combustion chamber. In the former case the gases are passed to the subsidiary nozzles through a valve or valves which is or are closed after a predetermined time by any suitable timing device. In the latter case the period of operation of the subsidiary nozzles is determined by the burning time of the auxiliary charge. The former method is considered suitable for large projectiles but the latter method is more suitable for smaller projectiles up to about three inches in diameter. In either case the time required to reach the requisite spin should be as short as possible.

The subsidiary nozzles must be symmetrically spaced around the body of the projectile in order to avoid any resultant lateral thrust on the projectile. To obtain a more even flow from the nozzles where a considerable number are in use, they may be arranged in symmetrically located groups the nozzles in each group being arranged in line longitudinally of the projectile. Optimum performance is obtained when the nozzles are tangential to the projectile surface and perpendicular to its axis.

A large number of small nozzles is preferred to a smaller number of large nozzles having the same total throat area. One disadvantage of the use of larger nozzles is that, since the length of the gas jet from a nozzle is proportional to the throat area of that nozzle, there is, in the early stage of flight, a greater risk of pressure waves being reflected from the ground to strike the projectile and hence produce some instability in a critical part of its trajectory. A second disadvantage of large nozzles when used with the auxiliary charge is that when, near the end of burning the charge breaks up, fragments of unburnt propellant may be ejected from the larger nozzles thereby causing irregularities in the gas flow, whereas the smaller nozzles tend to retain the fragments within the burning chamber until the charge is completely consumed.

It is obviously undesirable for the projectile to begin spinning whilst on or in the launcher. To avoid this in the case where an auxiliary charge is used in conjunction with the nozzles a small delay must be introduced between ignitions of the main and auxiliary charges so that spin may begin at approximately the instant when the rocket leaves the launcher. The necessary delay, which must be reproducible from round to round, may be applied by various methods. For example, an electronic delay device may be incorporated in the firing circuit so that current is applied to the auxiliary charge igniter at a predetermined time after it is applied to the igniter of the main charge. Alternatively a delay disc between the main charge and the auxiliary charge may be arranged to be destroyed by the burning of the main charge the auxiliary charge then being ignited by the already burning main charge. This alternative method has the disadvantage that some propellant gases from the main charge may be discharged through the subsidiary nozzles. A third and preferred method of introducing the delay is to use two coils one on the head of the projectile and connected to the auxiliary igniter the other on or near the launcher so arranged that the rocket passes through it. The launcher coil is energised at the moment of firing the main charge and the auxiliary charge is ignited by an induced current as the coil on the head of the projectile passes through the launcher coil. This method has the advantage that ignition of the auxiliary charge occurs when the rocket reaches a known fixed position.

Where the subsidiary nozzles are fed by propellant gases from the main charge the delay may be obtained by arranging that the timing device opens the valve or valves after a predetermined time, or by the use of a delay disc in co-operation with the valve or valves which could be initially set in the open position, or by any other suitable means. Several forms of spinning device in accordance with the invention will now be more particularly described, by way of example only, with reference to the accompanying drawings in which.

Figure 3:
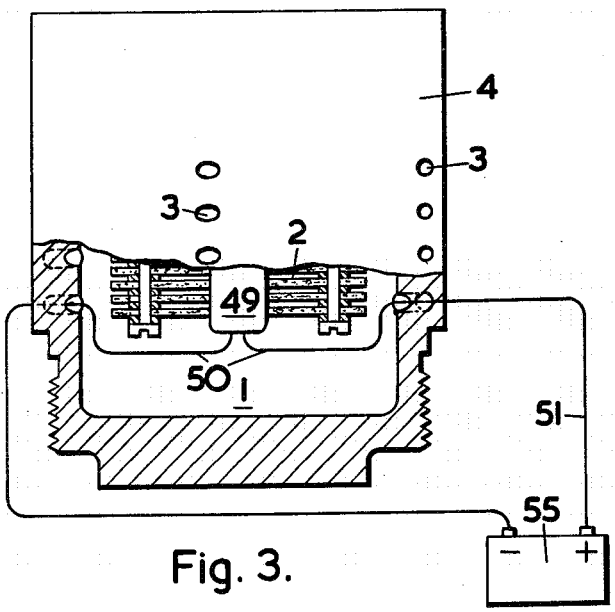
Figure 4:
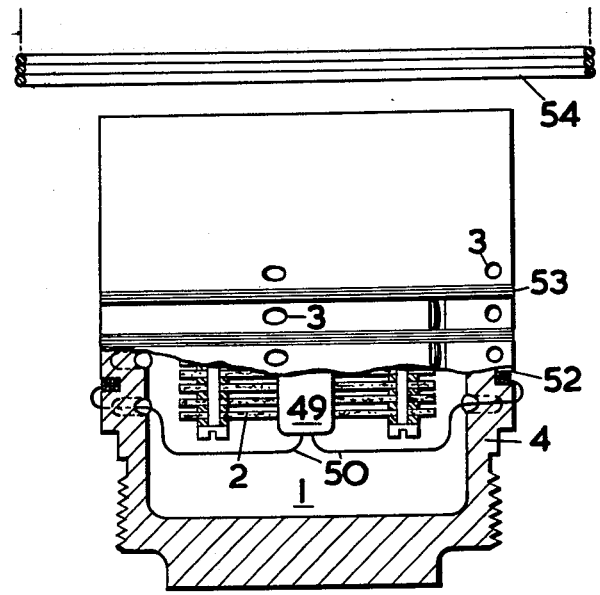
Figure 5:
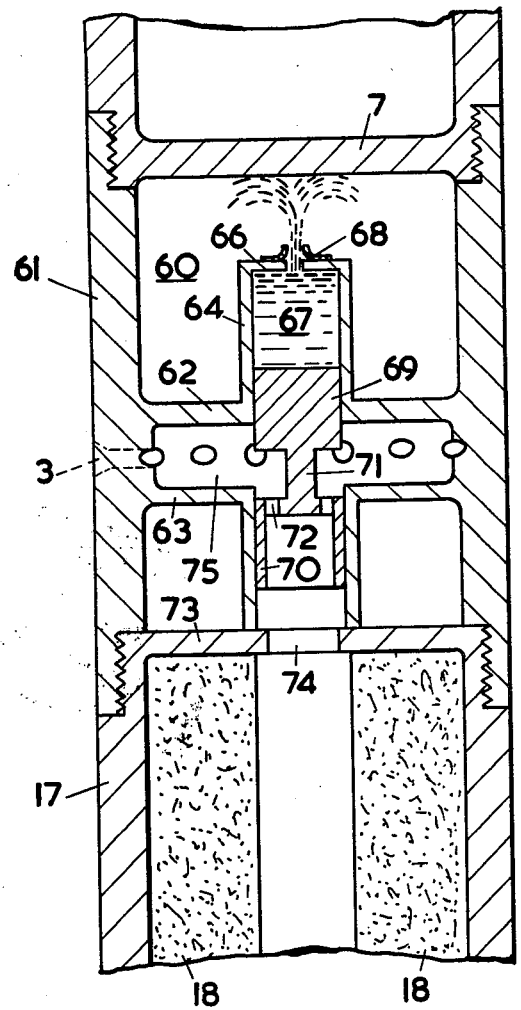

FIGURE 3 is a part longitudinal section of an auxiliary combustion chamber wherein an auxiliary charge is ignited electrically, the current being supplied through trailing leads, FIGURE 4 is a similar section to that of FIGURE 3 showing electrical ignition by means of induction coils, and FIGURE 5 is a longitudinal section of a spinning device which uses propellant gases from the main motor for imparting spin.

Figure 1:
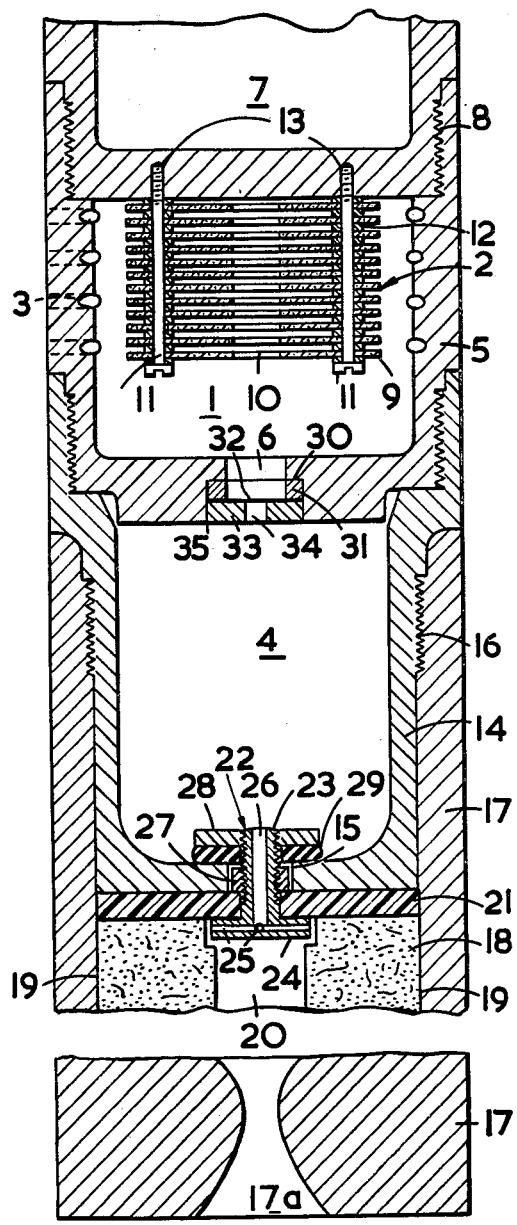
FIGURE 1 is a longitudinal section of part of a rocket projectile showing a spinning device having an auxiliary charge ignited from the main rocket motor.
Figure 2:
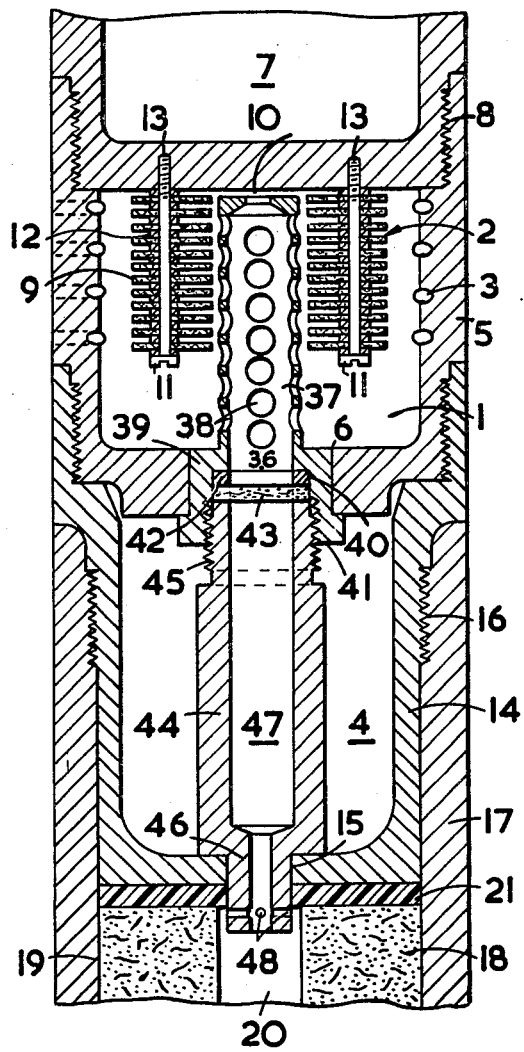
FIGURE 2 is a similar section showing an alternative igniting arrangement.

As shown in FIGURES 1 and 2 the spinning device includes an auxiliary combustion chamber 1 containing an auxiliary charge 2 and having a casing 5 whose wall has a plurality of orifices or subsidiary nozzles 3 therein; and a secondary chamber 4 rearward of the chamber 1.

The cylindrical casing 5 of the auxiliary combustion chamber 1 is closed at its rear end except for an axial orifice 6 and the forward end is closed by a nose member 7 screwed into an internally threaded recess 8 in the forward end of the casing 5. The wall of the casing 5 has therein four sets of subsidiary nozzles 3, equi-spaced around its circumference; each set containing four nozzles in line longitudinally. Each nozzle 3 is so formed that its axis lies in a transverse plane of the rocket and at as large an angle to the corresponding radius of that plane as is conveniently obtainable; the whole arrangement of nozzles 3 being symmetrical about the rocket axis.

The auxiliary charge 2 within the auxiliary combustion chamber 1 consists of a stack of discs 9 of propellant each having an axial hole 10 therein and two smaller holes symetrically spaced along a diameter of the disc for the reception of two screws 11. The screws 11 retain the discs 9 in a stack in which adjacent discs are separated by small separating washers 12, and engages holes 13 in the base of the nose meber 7 thereby supporting the charge 2 in the forward end of the chamber 1.

The secondary chamber 4 has a substantially cylindrical casing 14 closed at its rear end except for an axial orifice 15. The forward end of the casing 14 is internally threaded and screws on to a corresponding thread on the rear end of the auxiliary combustion chamber casing 5. The rearward portion of the casing 14 is of reduced external diameter and has an external thread 16 thereon for attachment to the forward end of the main motor casing 17 which surrounds the secondary chamber 4 throughout the major part of the length of the said chamber 4. Mounted at the rear end of the main motor casing 17 is a main jet 17a (FIGURE 1).

Within the main motor casing 17, rearward of the secondary chamber 4 is a cylindrical propellant or main charge 18, inhibited on its outer surface 19 and having an axial bore 20 which may be of any convenient cross section. An inhibiting disc 21 of a suitable material such as ethyl cellulose is bonded to the forward end of the charge 18 and has a central hole therein for the reception of a duct member.

In FIGURE 1 the propellant gases from the main charge 18 have access to the secondary chamber 4 through a duct member 22 which comprises a stem 23 having a circumferential flange 24 at its rearward end. Small bores 25 are drilled transversely through the flange 24 along two perpendicular diameters thereof to intersect on its axis and a third bore 26 of slightly greater diameter extends axially from the forward end of the stem to the intersection of the small bores 25. The flange 24 of the duct member 22 lies in a recess in the main charge 18 immediately rearward of the inhibiting disc 21 and the stem 23 extends forward through the central hole in the inhibiting disc 21 to which it is secured by a securing nut 27, and extends further through the orifice 15 in the rear end of the secondary chamber casing 14 to which it is secured by a nut 28 over a rubber sealing washer 29.

The axial orifice 6 in the rear end of the casing 5 of the auxiliary combustion chamber 1 is counterbored from its rearward end to form a shoulder 30. Within the orifice rearward of the shoulder 30 are a washer 31, a copper bursting disc 32 and a plug 33 having a central orifice 34. The plug is a push fit in the orifice 6 and may be further secured by burring over the edge 35 of the rear end of the orifice 6.

On ignition of the main charge 18, propellant gases are gradually admitted to the secondary chamber 4 through the restricted bores 25 and 26 in the duct member 22 and the pressure in the chamber 4 rises until it reaches a value predetermined by the thickness of the bursting disc 32 at which value the disc 32 ruptures. The propellant gases are then admitted to the auxiliary combustion chamber 1 where they ignite the auxiliary charge 2. Propellant gases thereafter are expelled through the inclined subsidiary nozzles 3 thereby imparting spin to the rocket. Propellant gases from the main charge are expelled from the nozzles 3 with those from the auxiliary charge 2 and continue to be so expelled after the auxiliary charge is all burnt but the pressure from this source is restricted by the duct member 22 and can be arranged not to produce an appreciable increase in spin.

In FIGURE 2 the orifice 6 in the base of the auxiliary combustion chamber 1 is enlarged to accept an igniter tube 36 which comprises a cylindrical tube 37 having four longitudinal rows of radial holes 38 and also having an enlarged rear portion 39 which fits the enlarged orifice 6. The enlarged portion 39 is counterbored to form a shoulder 40 and has a circumferential flange 41 which abuts the rear face of the base of the casing 5. In the counterbore and abutting the shoulder 40 is a washer 42 rearward of which is a cordite disc 43. Screwed into the counterbore and retaining the cordite disc in position is the forward end of a modified duct member which takes the form of a hollow cylinder 44 having an external screwthread 45 at its forward end and a cylindrical extension 46 of reduced diameter at its rearward end. The main bore 47 of the cylinder 44 is continued with a reduced diameter through the cylindrical extension 46 and is intersected by two small transverse bores 48. The tube 44 extends the full length of the secondary chamber 4 and its extension 46 passes through the axial orifice 15 and through the axial hole in the inhibiting disc 21 so that the small bores 48 lie within the axial bore of the main charge 18.

On ignition of the main charge 18, propellant gases are admitted through the small bores in the cylindrical extension 46 of the duct member into its main bore 47 where they ignite the cordite disc 43. After a time predetermined by the burning time of the disc 43 the gases are admitted to the igniter tube 36 and pass therefrom through the radial holes 38 to ignite the auxiliary charge 2.

Various combinations of the two igniting arrangements may be used; for example the cordite disc 43 of FIGURE 2 may be used in place of the bursting disc 32 in the arrangement of FIGURE 1 or the igniter tube 36 of FIGURE 2 may be used with either type of disc in combination with the duct member 22 shown in FIGURE 1. In any such combination the ignition arrangement imposes a delay after ignition of the main charge 18 before the auxiliary charge 2 is ignited the delay time being dependent on time required for the propellant gases from the main charge to penetrate the bursting disc 32 or the cordite disc 43.

The auxiliary combustion chambers 1 shown in FIGURES 3 and 4 are substantially similar to that illustrated in FIGURES 1 and 2 but have certain modifications imposed by the use of electrical ignition of the auxiliary charge 2. In both figures the axial orifice 6 in the base of the casing 5 is omitted and an electrically fired igniter 49 is inserted into the central hole through the charge 2 which igniter has leads 50 which are carried out of the chamber 1 through two of the nozzles 3.

In FIGURE 3 the leads 50 are continued as trailing wires 51 for connection to any suitable current source through an electronic delay device 55.

In FIGURE 4 the leads 50 are continued as a coil 53 wound into circumferential grooves 52 formed in the outer surface of the casing 5 between the nozzles 3. The coil 53 acts as a secondary induction coil in conjunction with a primary induction coil 54 so arranged that the projectile passes through it in the early stages of flight.

In the arrangement shown in FIGURE 3 a current is passed to the igniter 49 through the trailing wires 51 and the leads 50 the timing being arranged, by any suitable switching device, to ignite the auxiliary charge at the required instant. In the arrangement shown in FIGURE 4 the primary coil 54 is energised before firing and as the projectile passes through it a current is induced in the secondary coil 53 which current fires the igniter 49 to ignite the auxiliary charge 2.

The use of electrical ignition in the devices shown in FIGURES 3 and 4 eliminates the need for a secondary chamber 5 as shown in FIGURES 1 and 2 and the auxiliary combustion chamber 1 may therefore be attached directly to the forward end of the main rocket motor.

The spinning device shown in FIGURE 5 uses gases from the main charge for imparting spin. Screwed on to the forward end of the motor casing 17 is a nozzle member 60 into the forward end of which is screwed the nose member 7. The nozzle member 60 has a cylindrical outer wall 61 in which a single ring of nozzles 3 are formed symmetrically spaced around its circumference. The wall has two inwardly extending flanges 62 and 63 one on either side of the ring of nozzles 3. The forward flange 62 has at its inner edge a forwardly extending cylinder 64 and the rearward flange 63 has at its inner edge 2 rearwardly extending cylinder 65, the two cylinders 64 and 65 being coaxial and of the same internal diameter. The forward cylinder 64 is closed at its forward end by a disc 66 having an axial orifice 67 which is initially closed by a thin bursting disc 68. Within the bores of the cylinders 64, 65 is a valve member comprising a piston 69 and a cylindrical valve 70 connected by a rod 71. The valve 70 is a hollow cylinder closed at its forward end except for small ports 72. The forward end of the motor casing 17 is closed by a disc 73 which disc extends inwardly from the forward end of the casing 17 and has an axial orifice 74 whose diameter is slightly smaller than the bore of the tube 65 to provide a flange which limits the rearward movement of the valve member. The bore of the cylinder 64 forward of the piston 69 is filled with a fluid, for example, ethylene glycol.

The valve member is initially in its most rearward position in which the piston 69 closes the entrance to the annular space 75 between the flanges 62, 63. On ignition of the main charge pressure is exerted on the valve 70 to move it forward with the piston 69. The bursting disc 68 ruptures and liquid from the cylinder 64 is forced out through the orifice 67 into a space in the forward end of the nozzle member 60. The rate of forward movement of the piston is governed by the size of the orifice 67. After a short delay the entrance to the annular space 75 is uncovered by the forward movement of the piston 69 to allow propellant gases from the main charge 18 to enter through the ports 72 in the valve 70 into the annular space 75 whence they are discharged through the nozzles 3 to impart spin to the rocket. After a further delay, during which the piston 69 and valve 70 continue their forward movement, the valve 70 is brought into line with the annular space 75 to close it and cut off the flow of gases through the nozzles. The delay times may be arranged as required by suitable design of the valve assembly. The nozzle member 60 may be made in several parts if desired in order to simplify manufacture.

In all the devices illustrated, the outside diameters of the various parts may be designed to provide a good external ballistic shape for the rocket projectile.

We claim:

1. A rocket projectile having a nose member; a cylindrical auxiliary combustion chamber screwed on to the nose member; a plurality of subsidiary nozzles symmetrically spaced around the wall of said auxiliary combustion chamber for discharging propellant gases to impart spin to the projectile, each subsidiary nozzle being disposed substantially normal to the projectile axis and to the perpendicular from the subsidiary nozzle to that axis, the transverse rear wall of the said auxiliary combustion chamber having an axial orifice therein; an auxiliary charge within the said auxiliary combustion chamber which charge comprises a stack of cordite discs, separating washers between the discs and two screws passing through the discs and washers for attaching the charge to the nose member; a bursting disc supported within the axial orifice in the rear wall of the auxiliary combustion chamber; a cylindrical secondary chamber screwed on to the rear end of the auxiliary combustion chamber and having in its rear wall an axial orifice; a main motor casing screwed on to the rear end of the secondary chamber; a main propellant charge having therein an axial bore within the main motor casing; a main jet for discharge of gases from said propellant charge; and a duct member supported in the axial orifice in the rear wall of the secondary chamber and extending rearward into the axial bore of the main propellant charge, which duct member comprises a hollow stem closed at its rear end, a circular flange surrounding the rear end of the stem and having two small transverse bores therein which intersect the bore of the hollow stem thereby providing a restricted entry for propellant gases from the main charge into the secondary chamber to retard the build up of pressure on the rear face of the bursting disc and delay the bursting thereof and the subsequent ignition of the auxiliary charge.

2. A rocket projectile having a nose member; an auxiliary combustion chamber screwed on to the rear end of the nose member; a plurality of subsidiary nozzles symmetrically spaced around the wall of said auxiliary combustion chamber for discharging propellant gases to impart spin to the projectile, each subsidiary nozzle being disposed substantially normal to the projectile axis and to the perpendicular from the subsidiary nozzle to that axis, the rear wall of which chamber has therein an axial orifice; an auxiliary propellant charge within the auxiliary combustion chamber which charge comprises a stack of cordite discs each having an axial hole therein, separating washers between the discs and screws passing through the discs and washers for attaching the charge to the nose member; an igniter tube extending from the axial hole in the rear end of the auxiliary combustion chamber into the axial holes in the cordite discs and comprising a hollow cylinder having therein a plurality of radial holes for directing propellant gases passing therethrough radially into the auxiliary charge; a cordite disc supported in the rear end of the igniter tube; a secondary chamber screwed on to the rear end of the auxiliary combustion chamber and having in its transverse rear wall an axial orifice; a main motor casing screwed on to the rear end of the secondary chamber; a main propellant charge within the main motor casing and having an axial bore therein; a main jet for discharge of gases from said propellant charge; and a duct member extending from the igniter tube through the secondary chamber and the axial orifice in its base into the axial bore of the main charge which duct member comprises a hollow cylinder fitting into the rear end of the igniter tube behind the cordite disc and extending to the rear wall of the secondary chamber and a cylindrical extension on the rear end of the hollow cylinder and of reduced diameter extending through the axial orifice into the bore of the main charge in which cylindrical extension is an axial bore and two small transverse bores at its rearward end to admit propellant gases from the main charge to the hollow cylinder of the duct member to ignite the cordite disc and thence, after a delay imposed by the burning to rupture of the cordite disc, into the igniter tube and through the radial orifices therein to ignite the auxiliary charge.

3. A rocket projectile having a nose member; a nozzle member screwed to the rear end of the nose member which nozzle member comprises a cylindrical wall, a plurality of subsidiary nozzles symmetrically arranged in a ring around the wall, each subsidiary nozzle being disposed substantially normal to the projectile axis and to the perpendicular from the subsidiary nozzle to that axis, two inwardly extending flanges on the cylindrical wall one forward and one rearward of the ring of nozzles enclosing an annular space giving access to the nozzles, a forward cylinder closed at its forward end except for a small axial orifice which cylinder is integral with and extends forwardly from the inner edge of the forward flange, a rearward open ended cylinder integral with and extending rearwardly from the inner edge of the rear flange the rearward cylinder being coaxial with the forward cylinder and with the projectile and having the same internal diameter as the forward cylinder; a valve member within the common bore of the two cylinders which valve member comprises a piston, an axial rod extending rearwardly from the piston, and a cylindrical valve having longitudinal ports therein, the valve member being movable under the action of pressure on its rear end from a rearward position in which the entrance to the annular space between the flanges of the nozzle member is closed by the piston through an intermediate range of positions in which the entrance is open to a forward position in which the entrance is closed by the valve; a bursting disc closing the axial orifice in the forward end of the forward cylinder the bore of which forward cylinder forward of the piston is initially filled with liquid; a main motor casing screwed to the rear end of the nozzle member; a main jet at the rear end of the main motor casing; and a propellant charge within the main motor casing, propellant gases from which have access to the rear end of the valve member to exert pressure thereon whereby pressure is applied through the liquid to rupture the bursting disc whereafter the valve member is forwardly movable to open and, after an interval, reclose the entrance to the annular space between the flanges of the nozzle member the rate of forward movement being controlled by the rate at which liquid can issue from the orifice in the forward end of the forward cylinder, propellant gases being admitted, for the limited period in which the entrance to the annular space is open, through the ports into the annular space to be discharged through the subsidiary nozzles to impart spin to the projectile.

4. A rocket projectile having a nose member; a main motor casing; a main propellant charge within the main motor casing; a main nozzle attached to the main motor casing for discharge of gases from said propellant charge; an auxiliary chamber connected to said nose member; means connecting said auxiliary chamber to said main motor casing; a plurality of subsidiary nozzles symmetrically placed in planes transverse to the longitudinal axis of the projectile around the auxiliary chamber to discharge gases therefrom to impart spin to the projectile, each subsidiary nozzle directed to discharge tangentially to the exterior surface of the auxiliary chamber, an auxiliary charge within the auxiliary chamber adapted to provide additional propellant gases for discharge through the subsidiary nozzles; an interior transverse wall in the auxiliary chamber having a longitudinal axial orifice therein separating the auxiliary chamber from the main motor casing; a delay diaphragm supported within said axial orifice, said delay diaphragm being a bursting disc arranged to rupture when a predetermined pressure is applied to one side thereof; said connecting means being a secondary chamber interposed between the main propellant charge and the auxiliary chamber having access to the bursting disc on the side thereof remote from the auxiliary chamber, said secondary chamber having a restricted orifice connecting said secondary chamber with the main propellant charge to permit controlled entry of propellant gases from the main charge whereby build up of pressure in the secondary chamber is retarded to delay rupture of the bursting disc and subsequent ignition of the auxiliary charge.

5. A rocket projectile having a nose member; a main motor casing; a main propellant charge within the main motor casing; a main nozzle attached to the main motor casing for discharge of gases from said propellant charge; an auxiliary chamber connected to said nose member; means connecting said auxiliary chamber to said motor casing; a plurality of subsidiary nozzles symmetrically placed in planes transverse to the longitudinal axis of the projectile around the auxiliary chamber adapted to discharge gases therefrom to impart spin to the projectile, each subsidiary nozzle directed to discharge tangentially to the exterior surface of the auxiliary chamber, an auxiliary charge within said auxiliary chamber adapted to discharge through said subsidiary nozzles, said auxiliary chamber being sealed off from the main charge, a delay electric igniter for igniting the auxiliary charge comprising, a secondary induction coil wound coaxially on the outside of the auxiliary chamber, said secondary coil being connected to the auxiliary charge igniter, and a primary coil having a source of electric current and situated in a position encircling a suitable part of the rocket trajectory for inducing a current in said secondary coil to fire the igniter as the rocket passes through the energized primary coil.

6. A rocket projectile having a nose member; a main motor casing; a main propellant charge within the main motor casing; a main nozzle attached to the main motor casing for discharge of gases from said propellant charge; an auxiliary chamber connected to said nose member; means connecting said auxiliary to said main motor casing; a plurality of subsidiary nozzles symmetrically placed in planes transverse to the longitudinal axis of the projectile around the auxiliary chamber adapted to discharge gases therefrom to impart spin to the projectile, each subsidiary nozzle directed to discharge tangentially to the exterior surface of the auxiliary chamber, an auxiliary charge within said auxiliary chamber adapted to discharge through said subsidiary nozzles, said auxiliary chamber being sealed off from the main charge; a delay electric igniter for igniting the auxiliary charge comprising, a plurality of circumferential grooves in the exterior surface of the auxiliary chamber, a secondary induction coil wound in said grooves and connected to the electric igniter; and a primary coil having a source of electric current and situated in a position encircling a suitable part of the rocket trajectory for inducing a current in said secondary coil to fire the igniter as the rocket passes through the energised primary coil.

References Cited in the file of this patent
UNITED STATES PATENTS

| 37,940 | Plant | Mar. 17, 1863 |
| 1,102,653 | Goddard | July 7, 1914 |
| 2,489,953 | Burney | Nov. 29, 1949 |
| 2,504,648 | Chandler | Apr. 18, 1950 |
| 2,633,702 | Hickman | Apr. 7, 1953 |
| 2,750,887 | Marcus | June 19, 1956 |
| 2,789,505 | Cumming et al | Apr. 23, 1957 |